US012211248B2

(12) United States Patent
Abdollahian Noghabi et al.

(10) Patent No.: US 12,211,248 B2
(45) Date of Patent: Jan. 28, 2025

(54) CONSTRUCTING PROCESSING PIPELINE AT EDGE COMPUTING DEVICE

(71) Applicant: Microsoft Technology Licensing, LLC, Redmond, WA (US)

(72) Inventors: Shadi Abdollahian Noghabi, Kirkland, WA (US); Ranveer Chandra, Kirkland, WA (US); Krishna Kant Chintalapudi, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 469 days.

(21) Appl. No.: 17/576,783

(22) Filed: Jan. 14, 2022

(65) Prior Publication Data
US 2023/0230351 A1    Jul. 20, 2023

(51) Int. Cl.
*G06V 10/764* (2022.01)
*G06T 7/00* (2017.01)

(52) U.S. Cl.
CPC .............. *G06V 10/764* (2022.01); *G06T 7/97* (2017.01); *G06T 2207/10032* (2013.01); *G06T 2207/20081* (2013.01)

(58) Field of Classification Search
CPC .......... G06N 3/045; G06N 3/084; G06N 3/08; G06N 20/00; G06N 3/044; G06N 5/04; G06N 3/04; G06N 3/088; G06N 3/0464; G06N 3/047; G06N 3/09; G06N 3/098; G06V 10/82; G06V 10/764; G06V 10/774; G06V 10/95; G06V 10/96; G06V 2201/10;
(Continued)

(56) References Cited

U.S. PATENT DOCUMENTS 10,181,896 B1 * 1/2019 Swift ................. H04B 7/18519
2018/0246762 A1 * 8/2018 Tarsa .................... G06F 9/5083
(Continued)

OTHER PUBLICATIONS

"Landsat Missions", Retrieved From : https://www.usgs.gov/core-science-systems/nli/landsat/landsat-8?qt-science_support_page_related_con=0#qt-science_support_page_related_con, Feb. 11, 2013, 7 Pages.
(Continued)

*Primary Examiner* — Chan S Park
*Assistant Examiner* — Woo C Rhim
(74) *Attorney, Agent, or Firm* — Alleman Hall & Tuttle LLP

(57) ABSTRACT

A computing system including an edge computing device. The edge computing device may include an edge device processor configured to receive edge device contextual data including computing resource availability data. Based at least in part on the edge device contextual data, the edge device processor may select a processing stage machine learning model of a plurality of processing stage machine learning models and construct a runtime processing pipeline of one or more runtime processing stages including the processing stage machine learning model. The edge device processor may receive a runtime input, and, at the runtime processing pipeline, generate a runtime output based at least in part on the runtime input. The edge device processor may generate runtime pipeline metadata that indicates the one or more runtime processing stages included in the runtime processing pipeline. The edge device processor may output the runtime output and the runtime pipeline metadata.

16 Claims, 10 Drawing Sheets

(58) Field of Classification Search
CPC . G06T 2207/20081; G06T 2207/20084; G06T 1/20; G06T 7/97; G06T 2207/10032; G06F 18/214; G06F 9/505; G06F 9/4881; G06F 18/24; G06F 2209/509; G06F 9/542

See application file for complete search history.

(56) References Cited

U.S. PATENT DOCUMENTS

| | | | | |
|---|---|---|---|---|
| 2019/0034716 | A1* | 1/2019 | Kamarol | G06V 10/764 |
| 2019/0042955 | A1* | 2/2019 | Cahill | G06N 5/04 |
| 2020/0250003 | A1* | 8/2020 | Yang | G06V 30/19173 |
| 2020/0279173 | A1* | 9/2020 | Gupta | G06N 5/025 |
| 2020/0327371 | A1* | 10/2020 | Sharma | G06N 3/08 |
| 2020/0356415 | A1* | 11/2020 | Goli | G06N 20/00 |
| 2021/0014114 | A1* | 1/2021 | Doshi | H04L 41/5019 |
| 2021/0327018 | A1* | 10/2021 | Carranza | G06T 1/20 |
| 2021/0334629 | A1* | 10/2021 | Yuan | G06N 3/08 |
| 2021/0342733 | A1* | 11/2021 | Kotler | G06N 20/00 |
| 2021/0383258 | A1* | 12/2021 | O'Riordan | G06F 15/177 |
| 2022/0083389 | A1* | 3/2022 | Poothia | G06F 9/5027 |
| 2022/0180178 | A1* | 6/2022 | Tasinga | G06F 9/5011 |
| 2022/0327318 | A1* | 10/2022 | Radhakrishnan | G06F 18/2411 |
| 2023/0048481 | A1* | 2/2023 | Elder | G06N 3/0464 |
| 2023/0093698 | A1* | 3/2023 | Sandoval | G06V 10/96 382/103 |
| 2023/0196201 | A1* | 6/2023 | Imig | G06N 20/00 706/12 |
| 2023/0300195 | A1* | 9/2023 | Sharma | G06F 18/251 706/12 |

OTHER PUBLICATIONS

McClain, James, "Cloud Detection in Satellite Imagery", Retrieved From : https://www.azavea.com/blog/2021/02/08/cloud-detection-in-satellite-imagery/, Feb. 8, 2021, 9 Pages.

Colyer, Adrian, "Orbital Edge Computing: Nano Satellite Constellations as a New Class of Computer System", Retrieved from: https://blog.acolyer.org/2020/10/12/orbital-edge-computing/, Oct. 12, 2020, 8 Pages.

Hu, et al., "Enable Pipeline Processing of DNN Co-inference Tasks In the Mobile-Edge Cloud", In Proceeding of IEEE 6th International Conference on Computer and Communication Systems, Apr. 23, 2021, pp. 186-192.

Paraskevoulakou, "Leveraging the Serverless Paradigm for Realizing Machine Learning Pipelines Across the Edge-Cloud Continuum", In Proceeding of 24th Conference on Innovation in Clouds, Internet and Networks and Workshops, Mar. 1, 2021, pp. 110-117.

"International Search Report and Written Opinion Issued in PCT Application No. PCT/US22/052910", Mailed Date: Mar. 15, 2023, 11 Pages.

Skatchkovsky, et al., "Optimizing Pipelined Computation and Communication for Latency-Constrained Edge Learning", In Journal of IEEE Communications Letters, vol. 23, Issue 9, Sep. 2019, pp. 1542-1546.

* cited by examiner

CONSTRUCTING PROCESSING PIPELINE AT EDGE COMPUTING DEVICE

BACKGROUND

In many computing systems, computing processes are performed at edge computing devices that are subject to processing, memory, bandwidth, or energy constraints. For example, edge computing devices included in a distributed sensor system may be subject to these constraints, which may limit what types of computing processes are feasible to execute at the edge computing devices. In addition, when communication bandwidth is low or network connectivity is intermittent, computing processes may be difficult to offload from edge computing devices to server computing devices without incurring high latency.

SUMMARY

According to one aspect of the present disclosure, a computing system is provided, including an edge computing device. The edge computing device may include an edge device processor configured to, during a runtime phase, receive edge device contextual data including computing resource availability data for the edge computing device. Based at least in part on the edge device contextual data, the edge device processor may be further configured to select a processing stage machine learning model of a plurality of processing stage machine learning models stored in edge device memory of the edge computing device. The edge device processor may be further configured to construct a runtime processing pipeline of one or more runtime processing stages including the processing stage machine learning model. The edge device processor may be further configured to receive a runtime input. The edge device processor may be further configured to, at the runtime processing pipeline, generate a runtime output based at least in part on the runtime input. The edge device processor may be further configured to generate runtime pipeline metadata for the runtime output that indicates the one or more runtime processing stages included in the runtime processing pipeline. The edge device processor may be further configured to output the runtime output and the runtime pipeline metadata.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
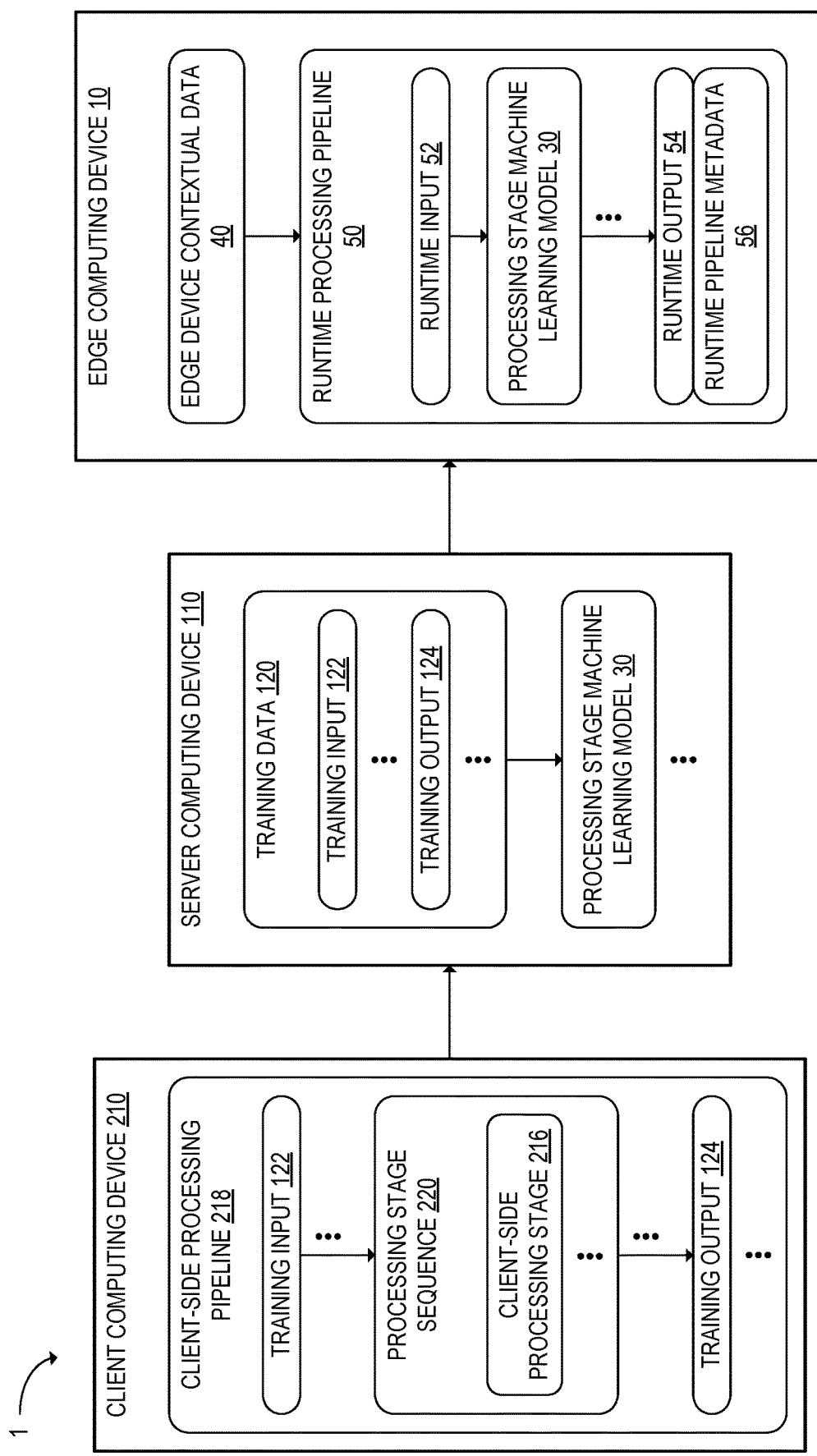
FIG. 1 schematically depicts a computing system including an edge computing device, a server computing device, and a client computing device, according to one example embodiment.

In order to address the challenges discussed above, a computing system 1 is provided, as schematically depicted in FIG. 1 according to one example embodiment. The example computing system 1 shown in FIG. 1 includes an edge computing device 10, a server computing device 110, and a client computing device 210. In the computing system 1, the server computing device 110 is configured to communicate with both the client computing device 210 and the edge computing device 10. As discussed in further detail below, a plurality of processing stage machine learning models 30 may be utilized at a runtime processing pipeline 50 executed at the edge computing device 10 to process runtime inputs 52 and compute runtime outputs 54 based at least in part on the runtime inputs 52. The processing stage machine learning models 30 may each be simulations of one or more client-side processing stages 216 that are executed in a processing stage sequence 220 at the client computing device. Thus, the behavior of resource-intensive portions of a client-side processing pipeline 218 may be simulated with less computationally expensive processing stage machine learning models 30 at the edge computing device 10.

At the server computing device 110, a plurality of processing stage machine learning models 30 may be trained to simulate the behavior of one or more processing stage sequences 220 included in the client-side processing pipeline 218 executed at the client computing device 210. The processing stage sequence 220 may include a plurality of sequential client-side processing stages 216. The server computing device 110 may receive training data 120 including training inputs 122 and training outputs 124 of the processing stage sequence 220 from the client computing device 210 and may use that training data 120 to train the plurality of processing stage machine learning models 30. Accordingly, the processing stage machine learning models 30 may be trained at the server computing device 110 without executing the one or more processing stage sequences 220 at the server computing device 110.

A plurality of processing stage machine learning models 30 may be trained at the server computing device 110 for use in different contexts at the edge computing device 10. The plurality of processing stage machine learning models 30 may be generated for the same processing stage sequence 220 or for a plurality of different processing stage sequences 220. At runtime, based at least in part on edge device contextual data 40, the edge computing device 10 may select a processing stage machine learning model 30 from among a plurality of processing stage machine learning models 30. When that processing stage machine learning model 30 is executed, the edge computing device 10 may be further configured to output runtime pipeline metadata 56 describing the stages included in the runtime processing pipeline 50. Thus, different processing stage machine learning models 30 may be used depending upon the context in which the runtime processing pipeline 50 is executed.

Figure 2:
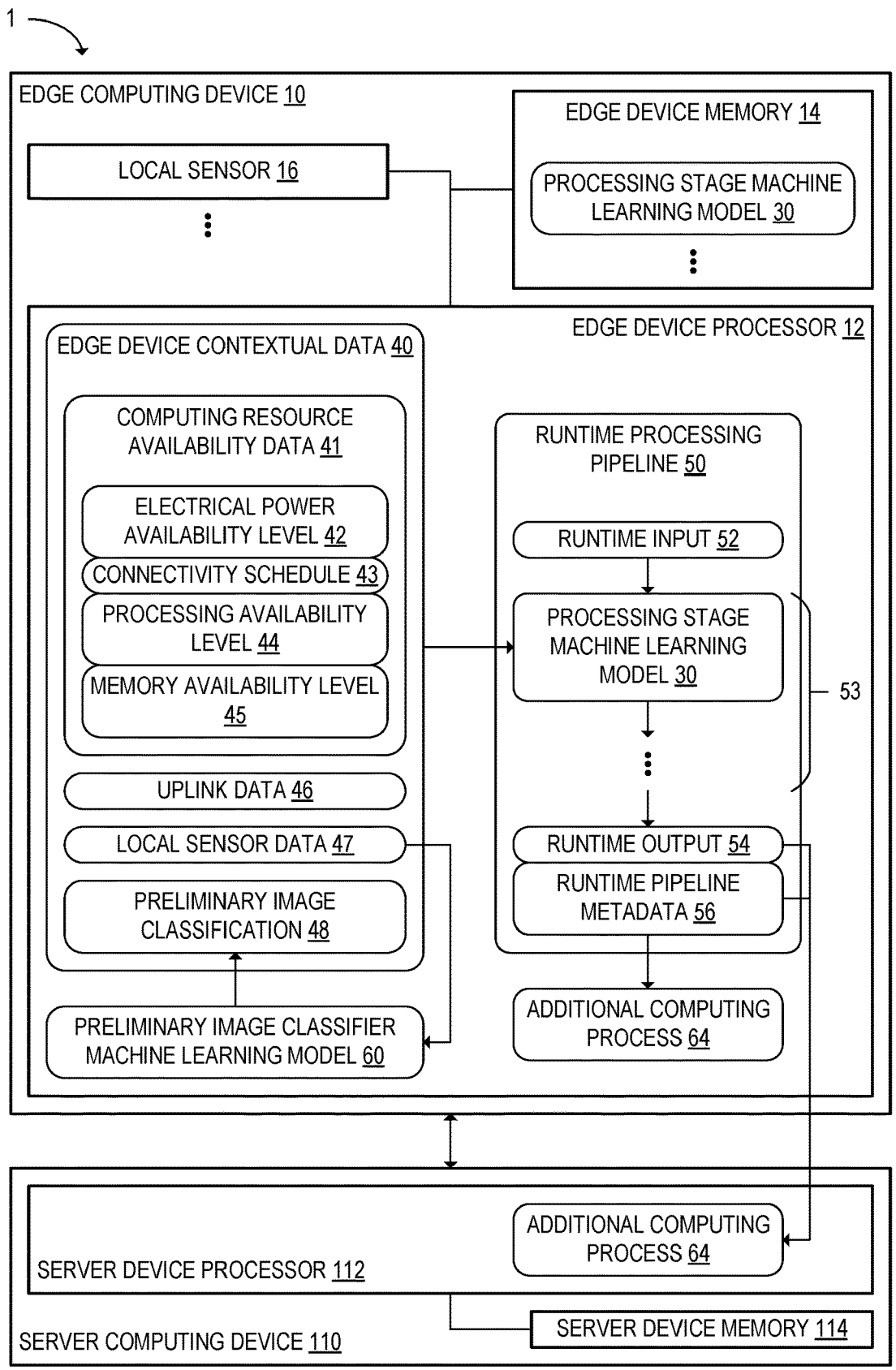
FIG. 2 schematically shows the edge computing device in additional detail when the edge computing device communicates with the server computing device, according to the example of FIG. 1.

FIG. 2 schematically shows the edge computing device 10 in additional detail when the edge computing device 10 communicates with the server computing device 110. As shown in the example of FIG. 2, the edge computing device 10 may include an edge device processor 12 that is communicatively coupled to edge device memory 14. The edge computing device 10 may further include one or more local sensors 16 that are communicatively coupled to the edge device processor 12 and the edge device memory 14. For example, the one or more local sensors 16 may include one or more imaging sensors, microphones, accelerometers, temperature sensors, pressure sensors, and/or other types of sensors. The one or more local sensors 16 may be configured to collect local sensor data 47, as discussed in further detail below. In some examples, the edge computing device 10 may be included in a distributed sensor system.

The server computing device 110, as shown in the example of FIG. 2, may include a server device processor 112 that is communicatively coupled to server device memory 114. The components of the server computing device 110 may, in some examples, be distributed between a plurality of physical computing devices that are configured to communicate over a network. For example, a plurality of physical computing devices located in a data center and configured to communicate over an internal data center network may instantiate the server computing device 110 as a virtual server computing device.

FIG. 2 shows the edge computing device 10 during a runtime phase. During the runtime phase, the edge device processor 12 may be configured to receive edge device contextual data 40. The edge device contextual data 40 may include computing resource availability data 41 for the edge computing device 10. For example, the computing resource availability data 41 may include an electrical power availability level 42 of the edge computing device 10. The electrical power availability level 42 may indicate a battery charging level in examples in which the edge computing device 10 is battery-powered. Additionally or alternatively, the electrical power availability level 42 may indicate an amount of electrical power received at the edge computing device from mains power, a photovoltaic cell, or some other electrical power source.

In some examples, the computing resource availability data 41 may further include a connectivity schedule 43 of the edge computing device 10 with the server computing device 110. The connectivity schedule 43 may indicate one or more estimated time intervals in which the edge computing device 10 is predicted to have the capability to communicate with the server computing device 110.

The computing resource availability data 41 may further include a processing availability level 44 for the edge device processor 12. Additionally or alternatively, the computing resource availability data may further include a memory availability level 45 of the edge device memory 14. The processing availability level 44 and the memory availability level 45 may respectively indicate amounts of processor utilization and memory utilization that are available to the runtime processing pipeline 50.

Figure 3:
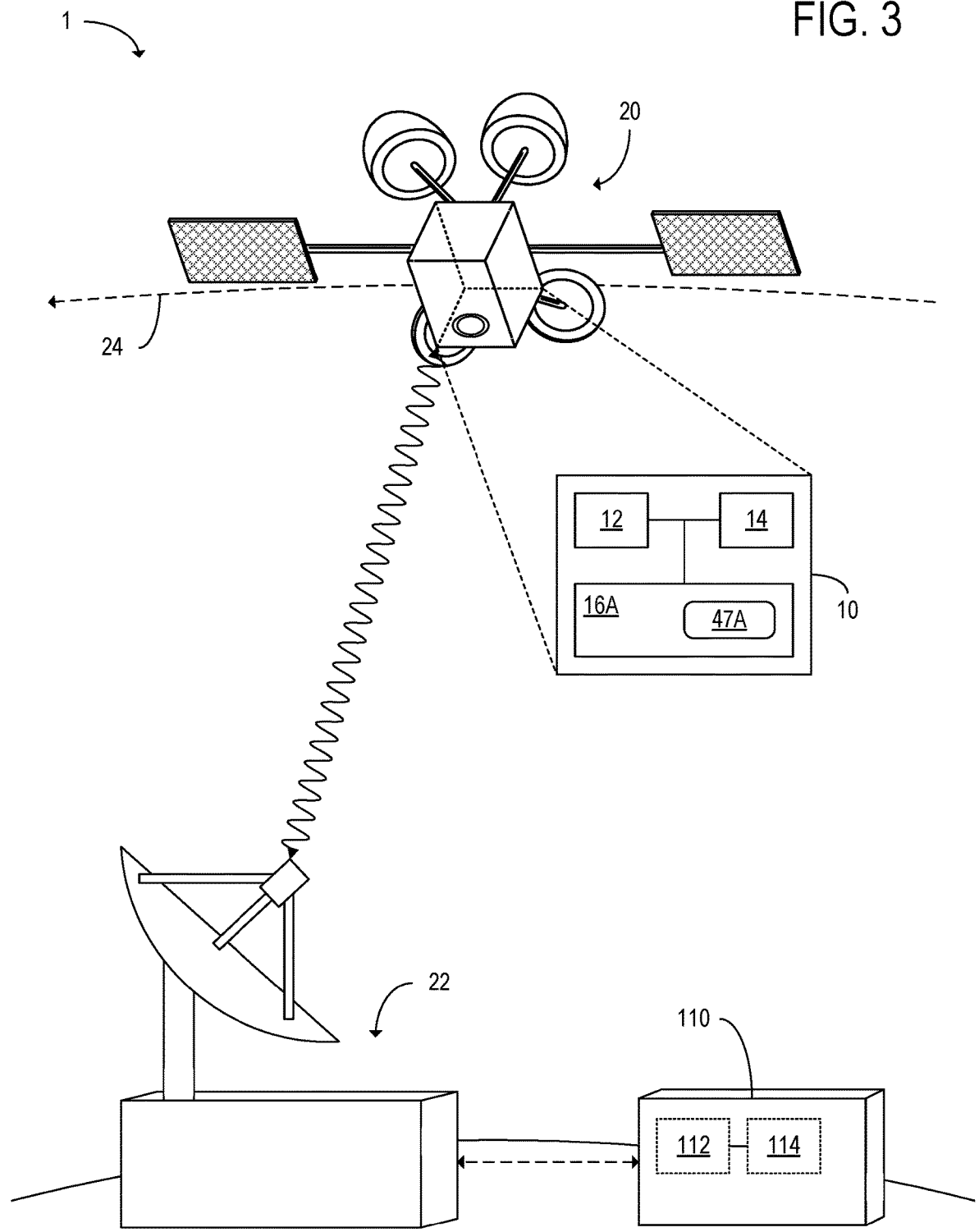
FIG. 3 shows an example configuration of the computing system in which the edge computing device is an onboard computing device of a satellite, according to the example of FIG. 1.

FIG. 3 shows an example configuration of the computing system 1 in which the edge computing device 10 is an onboard computing device of a satellite 20. The satellite 20 may, for example, be configured to collect satellite image data 47A at an imaging sensor 16A included among the one or more local sensors 16 of the edge computing device 10. The satellite image data 40 may be included in the edge device contextual data 40. Additionally or alternatively, the satellite image data 47A may be included in the runtime input 52 of the runtime processing pipeline 50. For example, at the runtime processing pipeline 50, the edge device processor 12 may be configured to perform image classification on the satellite image data 47A. The satellite 20 may additionally or alternatively include one or more other types of local sensors 16, such as one or more accelerometers.

In the example of FIG. 3, the edge computing device 10 is configured to communicate with the server computing device 110 via wireless communication with a ground station 22. The ground station 22 is further configured to communicate with the server computing device 110 over a wired or wireless connection. In the example of FIG. 3, the satellite 20 follows an orbit 24 around the Earth in which the satellite 20 does not always have a line of sight to the ground station 22. Accordingly, the computing resource availability data 41 may specify a connectivity schedule 43 one or more estimated time intervals at which the satellite 20 is predicted to have a line of sight to the ground station 22 based on the orbital trajectory of the satellite 20.

The edge device contextual data 40 may, in some examples, include other data in addition to the computing resource availability data 41. Returning to FIG. 2, in examples in which the edge computing device 10 is an onboard computing device of a satellite 20 as depicted in FIG. 3, the edge device contextual data 40 may further include uplink data 46 received at the satellite 20 from the ground station 22. The uplink data 46 may, for example, include data from one or more additional sensors configured to communicate with the ground station 22. As another example, the uplink data 46 may include map data for a geographic area configured to be imaged by the imaging sensor of the satellite 20. In some examples, the connectivity schedule 43 may be included in the uplink data 46.

The edge device contextual data 40 may further include local sensor data 47 received from the one or more local sensors 16. For example, the local sensor data 47 may include image data, audio data, acceleration data, temperature data, pressure data, or one or more other types of local sensor data 47. In the example of FIG. 3, the local sensor data 47 includes the satellite image data 47A.

In examples in which the local sensor data 47 included in the edge device contextual data 40 includes satellite image data 47A, the edge device processor 12 may be further configured to generate a preliminary image classification 48 for the satellite image data 47A. The preliminary image classification 48 may be a classification of one or more target objects or regions of interest in the satellite image data 47A. In some examples, generating the preliminary image classification 48 may include segmenting one or more images included in the satellite image data 47A. The preliminary image classification 48 may, for example, be generated at a preliminary image classifier machine learning model 60 executed at the edge device processor 12 to preprocess the satellite image data 47A. The preliminary image classifier machine learning model 60 may, for example, be a convolutional neural network, and may be pre-trained at the server computing device 110 prior to runtime deployment at the edge computing device 10.

In some examples, other inputs in addition to the local sensor data 47 may be used when computing the preliminary image classification 48. For example, a location of the satellite 20 in the orbit 24 may be used as an additional input. For example, when the location of the satellite 20 in the orbit 24 indicates that the satellite is over the ocean, the preliminary image classifier machine learning model 60 may be more likely to assign a "water" label to regions of a satellite image included in the satellite image data 47A compared to when the location of the satellite 20 in the orbit 24 indicates that the satellite 20 is over land. The location of the satellite 20 in the orbit 24 may, for example, be determined at the edge device processor 12 based at least in part on the connectivity schedule 43.

As shown in the example of FIG. 2, the edge device memory 14 may store a plurality of processing stage machine learning models 30. Based at least in part on the edge device contextual data 40, the edge device processor 12 may be further configured to select a processing stage machine learning model 30 of the plurality of processing stage machine learning models 30 stored in the edge device memory 14. In some examples, the edge device processor 12 may be configured to select two or more of the processing stage machine learning models 30. The edge device processor 12 may be further configured to construct a runtime processing pipeline 50 of one or more runtime processing stages 53 including the selected processing stage machine learning model 30. In some examples, the runtime processing pipeline 50 may further include one or more additional processing stages that are not machine learning models.

Figure 4:
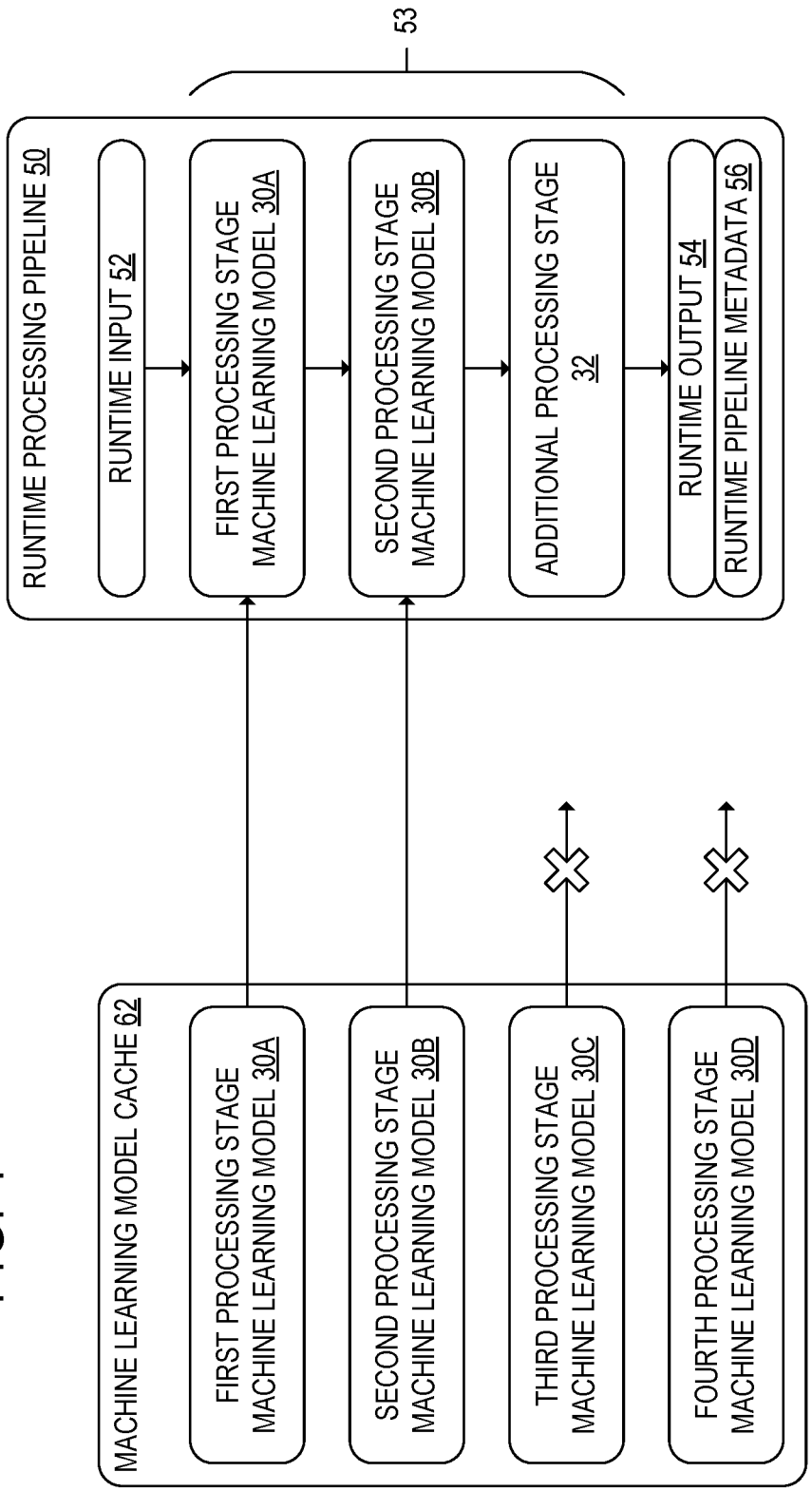
FIG. 4 schematically shows an example machine learning model cache and an example runtime processing pipeline, according to the example of FIG. 1.

FIG. 4 schematically shows a machine learning model cache 62 that may be stored in the edge device memory 14, according to one example. In addition, FIG. 4 shows an example runtime processing pipeline 50. The example machine learning model cache 62 shown in the example of FIG. 4 includes a first processing stage machine learning model 30A, a second processing stage machine learning model 30B, a third processing stage machine learning model 30C, and a fourth processing stage machine learning model 30D. When the edge device processor 12 constructs the example runtime processing pipeline 50 of FIG. 4, the edge device processor 12 is configured to select the first processing stage machine learning model 30A and the second processing stage machine learning model 30B for inclusion in the runtime processing pipeline 50. The third processing stage machine learning model 30C and the fourth processing stage machine learning model 30D are not selected. The plurality of runtime processing stages 53 included in the runtime processing pipeline further includes an additional processing stage 32 that is not a machine learning model.

Returning to the example of FIG. 2, the edge device processor 12 may be further configured to receive a runtime input 52. The runtime input 52 may, in some examples, include at least a portion of the local sensor data 47 collected at the one or more local sensors 16 of the edge computing device 10. In examples in which the edge computing device 10 is an onboard computing device of a satellite 20, the runtime input 52 may additionally or alternatively include at least a portion of the uplink data 46 received at the satellite 20 from the ground station 22. In another example, when the edge computing device 10 is included in a ground-based distributed sensor system, the runtime input 52 may further include sensor data received from one or more additional edge computing devices.

In the example runtime processing pipeline 50 of FIG. 4, the edge device processor 12 is configured to receive the runtime input 52 at the first processing stage machine learning model 30A. The edge device processor 12 is further configured to process the runtime input 52 at the first processing stage machine learning model 30A. The edge device processor 12 may be further configured to input an output of the first processing stage machine learning model 30A into the second processing stage machine learning model 30B, input an output of the second processing stage machine learning model 30B into the additional processing stage 32, and generate the runtime output 54 at the additional processing stage 32. For example, the runtime output 54 may be an image processing output such as an image classification or segmentation in examples in which the runtime input 52 includes image data.

When the edge device processor 12 generates the runtime output 54 at the runtime processing pipeline 50, the edge device processor 12 may be further configured to generate runtime pipeline metadata 56 for the runtime output 54. The runtime pipeline metadata 56 may indicate the one or more runtime processing stages 53 included in the runtime processing pipeline 50. For example, the metadata 56 may indicate one or more runtime processing stages 53 by including a respective stage identifier for each of the stages 53. The runtime pipeline metadata 56 may further indicate the ordering of the runtime processing stages 53. The ordering may be indicated, for example, by including the stage identifiers in a particular order in the metadata, or by other convention.

Subsequently to generating the runtime output 54 and the runtime pipeline metadata 56, the edge device processor 12 may be further configured to output the runtime output 54 and the runtime pipeline metadata 56 to one or more additional computing processes 64. The one or more additional computing processes 64 may be executed at the edge device processor 12 and/or the server device processor 112. For example, the one or more additional computing processes 64 may include an analytics module configured to perform statistical analysis on the runtime output 54. As another example, the one or more additional computing processes 64 may include a graphical user interface (GUI) generating module configured to generate a GUI for output at a display device. Thus, in such examples, the runtime output 54 and/or the runtime pipeline metadata 56 may be output for display at the GUI.

Accordingly, when the runtime output 54 is received at the one or more additional computing processes 64, the runtime output 54 may be accompanied by runtime pipeline metadata 56 that specifies the one or more processing stage machine learning models 30, as well as one or more additional processing stages 32 in some examples, that were selected for inclusion in the runtime processing pipeline 50. The one or more additional computing processes 64 may refer to the runtime pipeline metadata 56 when determining how the runtime output 54 is processed. For example, the size of the runtime output 54 may differ depending upon the one or more processing stage machine learning models 30 that are selected for inclusion in the runtime processing pipeline 50. In such examples, when the additional computing process 64 receives the runtime output 54 and the runtime pipeline metadata 56, the edge device processor 12 or the server device processor 112 may be configured to set an expected input size for the additional computing process 64 to the size of the runtime output 54, as indicated by the runtime pipeline metadata 56. Other data type properties of the runtime output may similarly be indicated in the runtime pipeline metadata 56 and may be used to specify one or more settings of the additional computing process 64.

Figure 5:
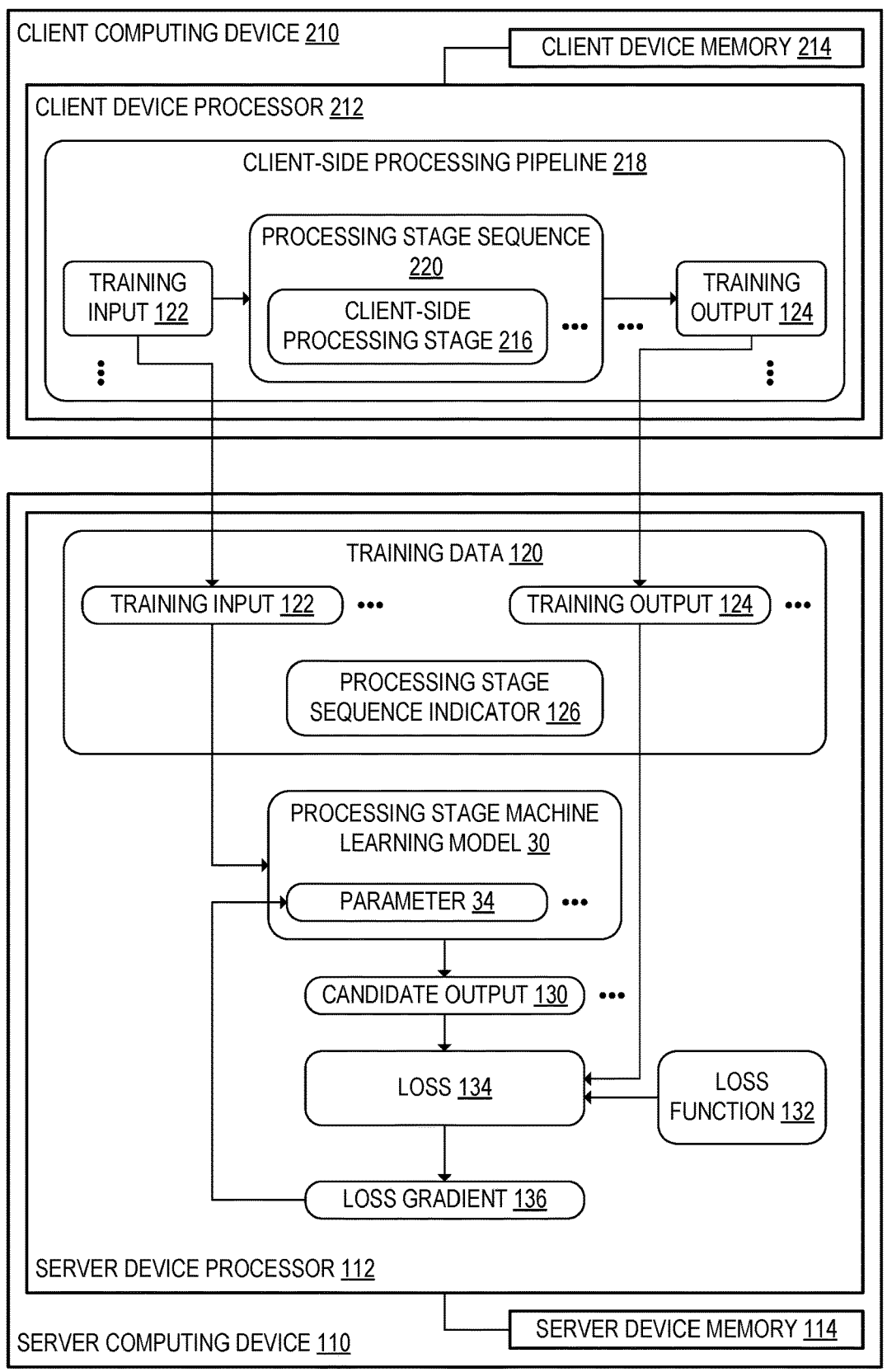
FIG. 5 schematically shows the server computing device and the client computing device during training of a plurality of processing stage machine learning models, according to the example of FIG. 1.

FIG. 5 schematically shows the server computing device 110 and the client computing device 210 during training of the plurality of processing stage machine learning models 30, according to one example. The server device processor 112 of the server computing device 110 may be configured to train the plurality of processing stage machine learning models 30 during a training phase using respective training data 120 received from the client computing device 210. When each processing stage machine learning model 30 is trained, the server device processor 112 may be configured to iteratively update a plurality of parameters 34 of the processing stage machine learning model 30 in a plurality of parameter updating iterations, as discussed in further detail below.

At the client computing device 210, the client device processor 212 may be configured to execute a training processing pipeline. The training processing pipeline may be a client-side processing pipeline 218 at which the client device processor 212 may be configured to apply one or more processing stage sequences 220 to a plurality of training inputs 122. Accordingly, at the client-side processing pipeline 218, the client device processor 212 may be configured to generate a corresponding plurality of training outputs 124. Each of the processing stage sequences 220 may include one or more client-side processing stages 216.

The client device processor 212 may be further configured to transmit the plurality of training inputs 122 and the plurality of training outputs 124 to the server computing device 110 to be used as the training data 120 for the processing stage machine learning models 30. For each training-input-training-output pair, the training data 120 may further include a processing stage sequence indicator 126 that indicates the one or more client-side processing stages 216 with which the training output 124 was generated. The server computing device 110 may obtain the training inputs 122 and the training outputs 124 without having to execute the client-side processing pipeline 218. Thus, the user of the client computing device 210 may avoid having to send proprietary code included in the client-side processing pipeline 218 to another computing device.

The server device processor 112 may be configured to train the plurality of processing stage machine learning models 30 such that the plurality of processing stage machine learning models 30 each correspond to a respective processing stage sequence 220 included in the client-side processing pipeline 218. In some examples, the plurality of processing stage machine learning models 30 may include two or more processing stage machine learning models 30 that are trained for a same processing stage sequence 220. In such examples, the two or more processing stage machine learning models 30 may have differing parameter counts. Thus, the respective accuracy levels and the respective computational costs associated with performing inferencing at the two or more processing stage machine learning models 30 may differ. For example, the two or more processing stage machine learning models 30 generated for the same processing stage sequence 220 may be configured to perform image segmentation with different levels of resolution. During the runtime phase, when the edge device processor 12 selects a processing stage machine learning model 30 for inclusion in the runtime processing pipeline 50, the edge device processor 12 may be configured to make a tradeoff between the accuracy of the runtime output 54 and the amount of computing performed at the processing stage machine learning model 30.

The plurality of processing stage machine learning models 30 may, in some examples, include two or more processing stage machine learning models 30 that are trained for differing respective processing stage sequences 220. In such examples, the respective processing stage sequences 220 may be partially overlapping. Alternatively, the respective processing stage sequences 220 may be non-overlapping.

Training the processing stage machine learning models 30 for different processing stage sequences 220 may allow the edge device processor 12 to utilize machine learning models during different portions of the runtime processing pipeline 50 depending upon the edge device contextual data 40. During the runtime phase, the edge device processor 12 may be configured to select, based at least in part on the edge device contextual data 40, which of a plurality of runtime processing stages 53 to perform using a processing stage machine learning model 30 and which of the runtime processing stages 53 to perform as an additional processing stage 32 that does not make use of machine learning. The edge device processor 12 may be configured to construct the runtime processing pipeline 50 using processing stage machine learning models 30 generated for different processing stage sequences 220 depending upon which of the runtime processing stages 53 are selected to be implemented as processing stage machine learning models 30. The edge device processor 12 may therefore have greater flexibility in constructing the runtime processing pipeline 50 when respective processing stage machine learning models 30 are trained for different processing stage sequences 220.

During training of each processing stage machine learning model 30, as shown in the example of FIG. 5, the server device processor 112 may be configured to input the plurality of training inputs 122 into the processing stage machine learning model 30, at which the server device processor 112 is further configured to generate a corresponding plurality of candidate outputs 130. The server device processor 112 may be further configured to compute a loss 134 for the processing stage machine learning model 30 using the candidate outputs 130, the training outputs 124, and a loss function 132. The loss function 132 may be constructed such that value of the loss 134 is configured to increase as a distance between the candidate output 130 and the corresponding training output 124 increases. The server device processor 112 may be further configured to compute a loss gradient 136 of the loss 134 with respect to the parameters 34 of the processing stage machine learning model 30, and to perform gradient descent using the loss gradient to update the parameters 34 of the processing stage machine learning model 30 via backpropagation. Thus, the server device processor 112 may train the processing stage machine learning model 30 to simulate the processing stage sequence 220 for which the plurality of training outputs 124 are generated.

Figure 6:
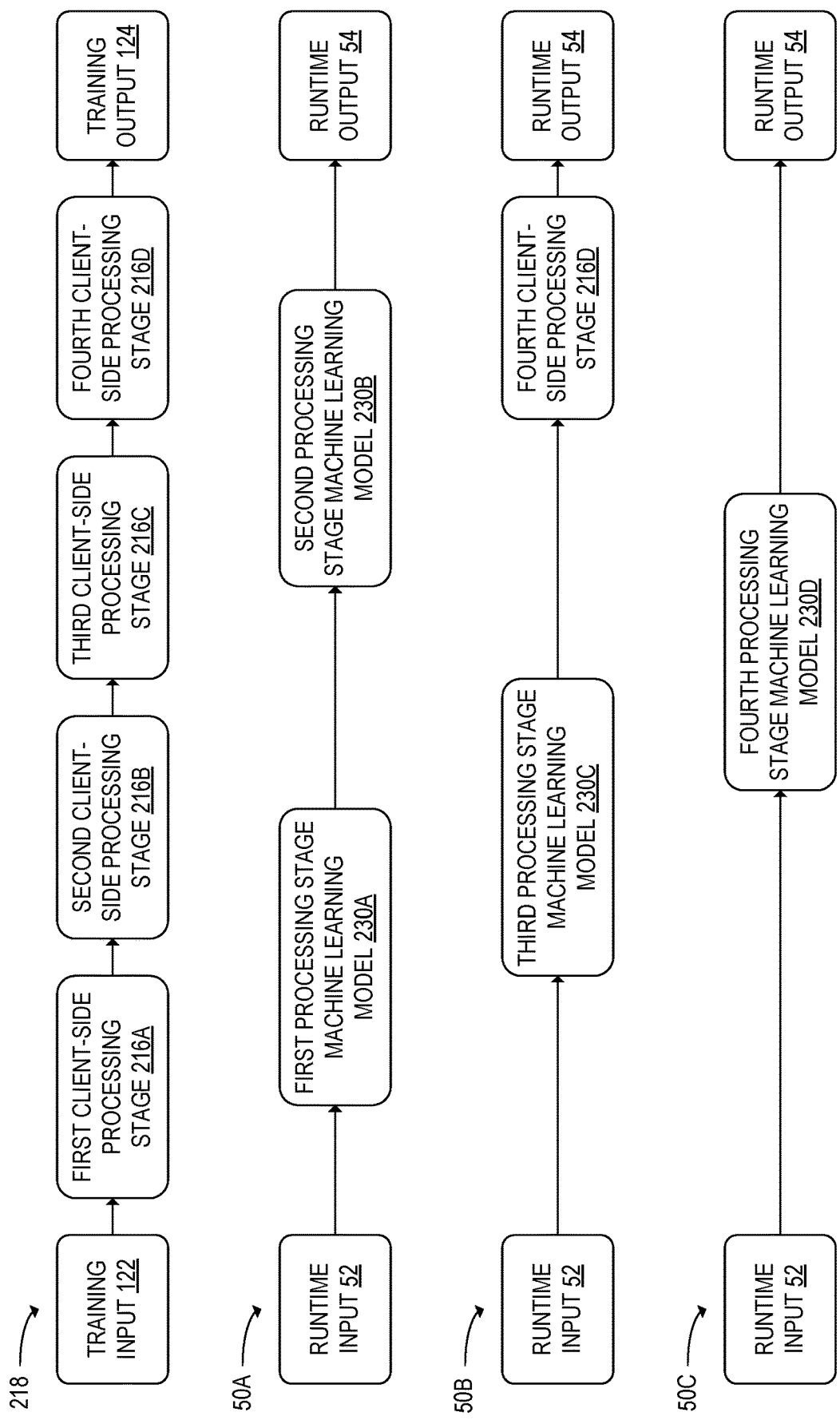
FIG. 6 schematically shows an example client-side processing pipeline and a plurality of example runtime processing pipelines that are configured to simulate the client-side processing pipeline, according to the example of FIG. 1.

FIG. 6 schematically shows an example client-side processing pipeline 218 and a plurality of example runtime processing pipelines 50 that are configured to simulate the client-side processing pipeline 218. The client-side processing pipeline 218 includes a first client-side processing stage 216A, a second client-side processing stage 216B, a third client-side processing stage 216C, and a fourth client-side processing stage 216D in the example of FIG. 6.

In a first runtime processing pipeline 50A shown in FIG. 6, the client-side processing pipeline 218 is simulated with a first processing stage machine learning model 230A and a second processing stage machine learning model 230B. The first processing stage machine learning model 230A is trained to simulate the first client-side processing stage 216A and the second client-side processing stage 216B, and the second processing stage machine learning model 230B is trained to simulate the third client-side processing stage 216C and the fourth client-side processing stage 216D.

FIG. 6 further shows an example of a second runtime processing pipeline 50B that may be used to simulate the example client-side processing pipeline 218. In the second runtime processing pipeline 50B, a third processing stage machine learning model 230C is configured to simulate the first client-side processing stage 216A, the second client-side processing stage 216B, and the third client-side processing stage 216C. In addition, the second runtime processing pipeline 50B further includes the fourth client-side processing stage 216D. Thus, the second runtime processing pipeline 50B incorporates a portion of the original client-side processing pipeline 218 in addition to a simulation of a processing stage sequence 220.

FIG. 6 further shows an example of a third runtime processing pipeline 50C. The third runtime processing pipeline 50C includes a fourth processing stage machine learning model 230D that is trained to simulate all of the client-side processing stages 216 included in the client-side processing pipeline 218. Thus, the fourth processing stage machine learning model 230D is an end-to-end simulation of the client-side processing pipeline 218.

Although, in the example of FIGS. 5-6, the training processing pipeline is a client-side processing pipeline 218, the training processing pipeline may be a server-side processing pipeline executed at the server computing device 110 in other examples.

Figure 7:
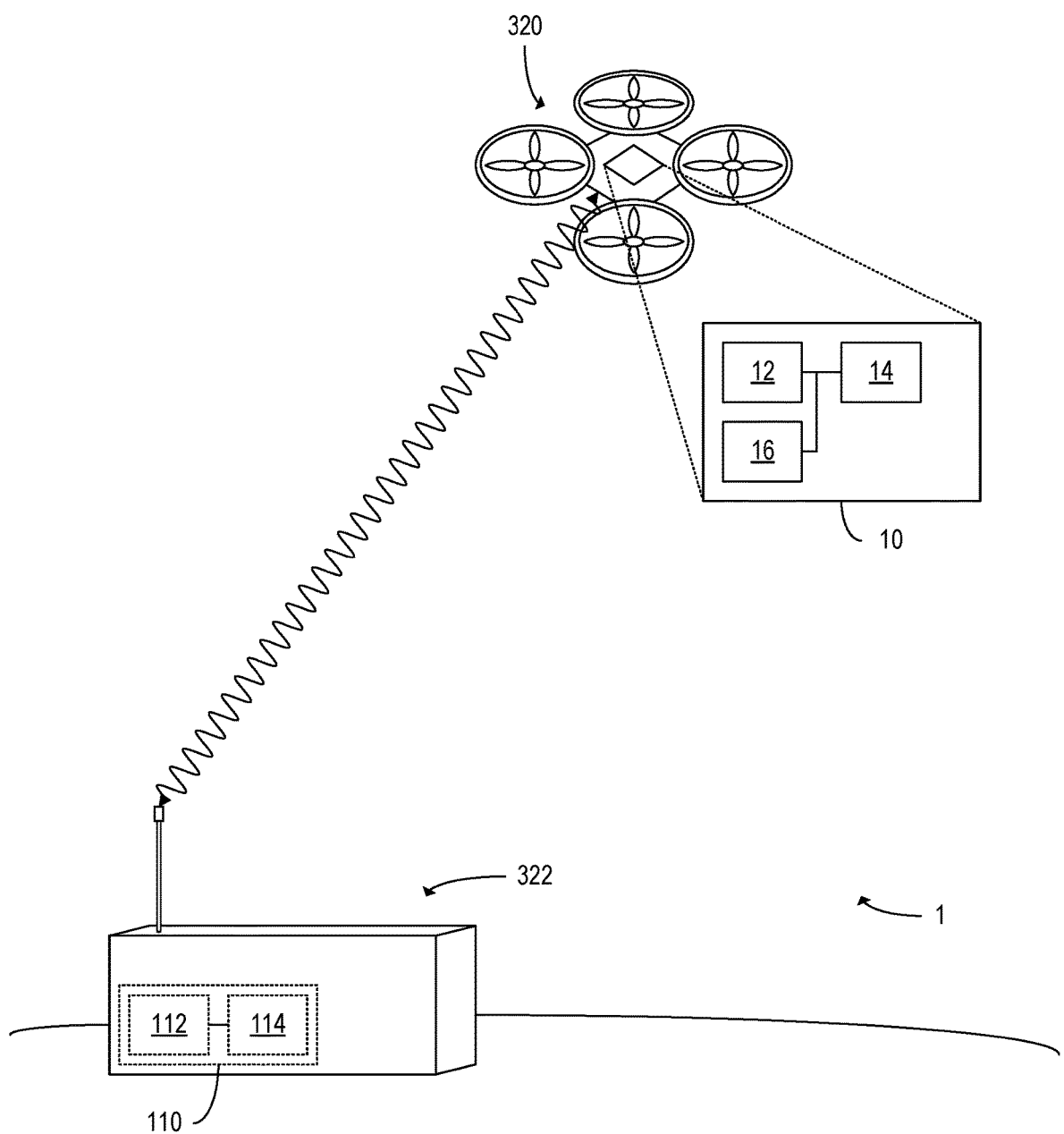
FIG. 7 shows the computing system in an example in which the edge computing device is an onboard computing device of an unmanned aerial vehicle, according to the example of FIG. 1.

FIG. 7 shows the computing system 1 in an example in which the edge computing device 10 is an onboard computing device of an unmanned aerial vehicle (UAV) 320. In the example of FIG. 7, the UAV 320 is configured to have intermittent wireless connectivity to a control station 322 at which the server computing device 110 is located. During times at which the UAV 320 does not have wireless communication with the control station 322, the edge device processor 12 included in the edge computing device 10 may be configured to perform autonomous navigation for the UAV 320. The edge device processor 12 may be configured to perform autonomous navigation at the runtime processing pipeline 50. Since autonomous navigation is a time-sensitive computing task, the edge device processor 12 may be configured to execute a runtime processing pipeline 50 that is constructed to have low latency.

The edge device processor 12 may be configured to perform autonomous navigation at the runtime processing pipeline 50 when the computing resource availability data 41 indicates that the edge device processor 12 does not have wireless connectivity to the control station 322. When the edge device processor 12 is configured to perform autonomous navigation for the UAV 320, the runtime processing pipeline 50 may be configured to receive local sensor data 47 as at least a portion of the runtime input 52 and to generate an actuator control signal as the runtime output 54. One or more processing stage machine learning models 30 that have been trained to simulate one or more respective processing stage sequences 220 may be executed at the edge device processor 12 when performing autonomous navigation. Thus, one or more client-side processing stages 216 that may otherwise have too high latency or be too processing- or memory-intensive to execute at the edge computing device 10 in real time may be simulated using one or more processing stage machine learning models 30 that may be executed more quickly and with fewer computing resources.

Figure 8A:
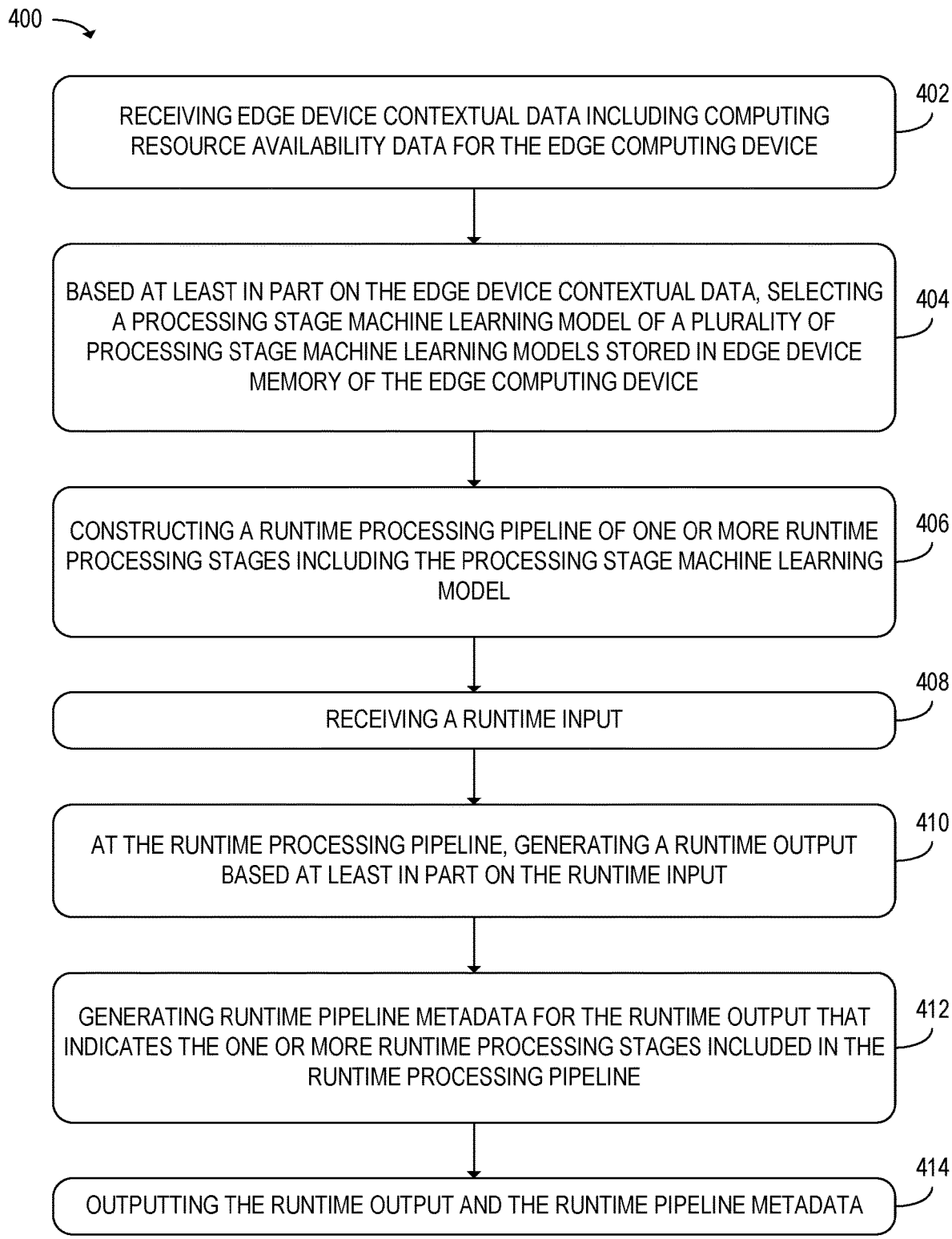
FIG. 8A shows a flowchart of an example method for use with a computing system to construct and execute a runtime processing pipeline, according to the example of FIG. 1.

Turning now to FIG. 8A, a flowchart of an example method 400 for use with a computing system is provided. The method 400 may be used with the computing system 1 of FIG. 1 or with some other computing system that includes an edge computing device. The computing system may further include a server computing device and may also include a client computing device in some examples. The steps shown in FIG. 8A may be performed during a runtime phase. As discussed below, other steps of the method 400 may be performed during a training phase for a plurality of processing stage machine learning models.

At step 402, the method 400 may include receiving edge device contextual data including computing resource availability data for the edge computing device. The computing resource availability data may, for example, include an electrical power availability level for the edge computing device. Additionally or alternatively, the computing resource availability data may further include a connectivity schedule of the edge computing device with a server computing device. The connectivity schedule may indicate one or more time intervals of expected wireless connectivity between the edge computing device and the server computing device. For example, when the edge computing device is included in a satellite, the connectivity schedule may indicate one or more time intervals at which the satellite is predicted to have a line of sight to a ground station. The computing resource availability data may further include a processing availability level that indicates an amount of processing utilization that is available to the runtime processing pipeline, and may further include a memory availability level that indicates an amount of memory utilization that is available to the runtime processing pipeline.

Other data in addition to the computing resource availability data may also be included in the edge device contextual data. In examples in which the edge computing device is included in a satellite, the edge device contextual data may further include uplink data received at the satellite from a ground station. Additionally or alternatively, when the edge computing device includes one or more local sensors, the edge device contextual data may further include local sensor data received from the one or more local sensors. The local sensor data may, for example, include satellite image data collected at an imaging sensor of the satellite in examples in which the edge computing device is included in a satellite. In other examples, the local sensor data may include image data, audio data, acceleration data, temperature data, pressure data, or one or more other types of local sensor data received from one or more local sensors included in some other type of edge computing device. For example, the one or more local sensors may be included in a UAV.

At step 404, the method 400 may further include selecting a processing stage machine learning model of a plurality of processing stage machine learning models based at least in part on the edge device contextual data. The plurality of processing stage machine learning models may be stored in edge device memory of the edge computing device. In some examples, two or more processing stage machine learning models may be selected.

At step 406, the method 400 may further include constructing a runtime processing pipeline of one or more runtime processing stages including the processing stage machine learning model. In examples in which two or more processing stage machine learning models are selected at step 404, the two or more processing stages may be included in the runtime processing pipeline. The runtime processing pipeline may further include one or more additional processing stages other than machine learning models.

At step 408, the method 400 may further include receiving a runtime input. The runtime input may be received at least in part from the one or more local sensors of the edge computing device in some examples. For example, when the edge computing device is included in a satellite, the runtime input may include satellite image data. Additionally or alternatively, the runtime input may include one or more other types of sensor data. The sensor data included in the runtime input may be received from the one or more local sensors included in the edge computing device, as discussed above. The runtime input may, in some examples, additionally or alternatively include data received from one or more other computing devices included in the computing system. For example, the runtime input may include at least a portion of the uplink data received from the ground station in examples in which the edge computing device is an onboard computing device of a satellite.

At step 410, the method 400 may further include generating a runtime output at the runtime processing pipeline based at least in part on the runtime input. Thus, when the runtime output is generated, the runtime input may be processed at the one or more processing stages included in the runtime processing pipeline to compute the runtime output. The runtime output may, for example, be an image classification or segmentation output in examples in which the runtime input includes image data. Other types of output data may additionally or alternatively be included in the runtime output.

At step 412, the method 400 may further include generating runtime pipeline metadata for the runtime output that indicates the one or more runtime processing stages included in the runtime processing pipeline. Other metadata such as the ordering of the processing stages may also be included in the runtime pipeline metadata.

At step 414, the method 400 may further include outputting the runtime output and the runtime pipeline metadata. The runtime output and the runtime pipeline metadata may be output to one or more additional computing processes executed at the edge computing device or the server computing device. Additionally or alternatively, the runtime output and/or the runtime pipeline metadata may be output to a user interface.

Figure 8B:
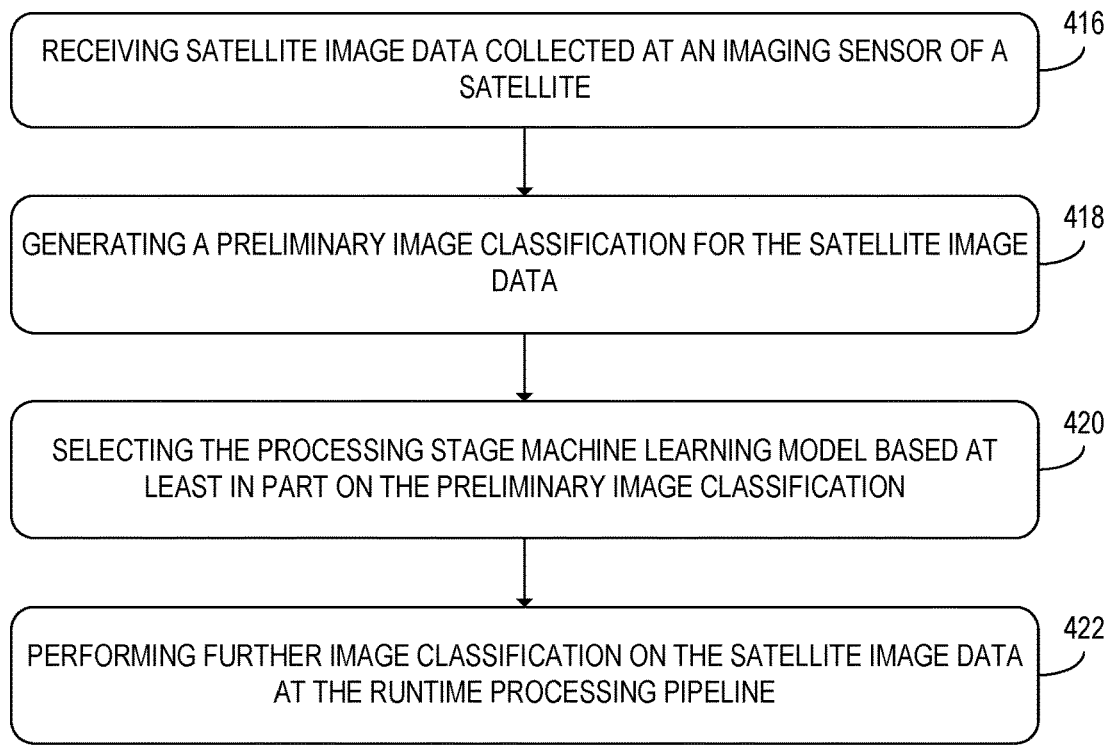
FIG. 8B shows additional steps of the method of FIG. 8A that may be performed when the edge computing device is an onboard computing device of a satellite.

FIG. 8B shows additional steps of the method 400 that may be performed in some examples when the edge computing device is an onboard computing device of a satellite. At step 416, the method 400 may further include receiving satellite image data collected at an imaging sensor of the satellite. Step 416 may be performed when performing step 402.

At step 418, the method 400 may further include generating a preliminary image classification for the satellite image data. The preliminary image classification may include one or more classification labels associated with one or more regions or objects included in the satellite image data. The preliminary image classification may be generated at a preliminary image classifier machine learning model that is configured to receive the satellite image data as input and to output the preliminary image classification. For example, the preliminary image classifier machine learning model may be a convolutional neural network.

The preliminary image classification may be included in the edge device contextual data. Thus, at step 420, the method 400 may further include selecting the processing stage machine learning model based at least in part on the preliminary image classification. Step 420 may be performed when performing step 404.

At step 422, the method 400 may further include performing further image classification on the satellite image data at the runtime processing pipeline. Thus, the satellite image data may be used as the runtime input when performing step 410. When the steps of FIG. 8B are performed, preliminary classification may be performed on the satellite image data prior to processing the satellite image data at the runtime processing pipeline, thereby allowing the edge device processor to select a suitable processing stage machine learning model without having to wait until the satellite has connectivity with a ground station.

Figure 8C:
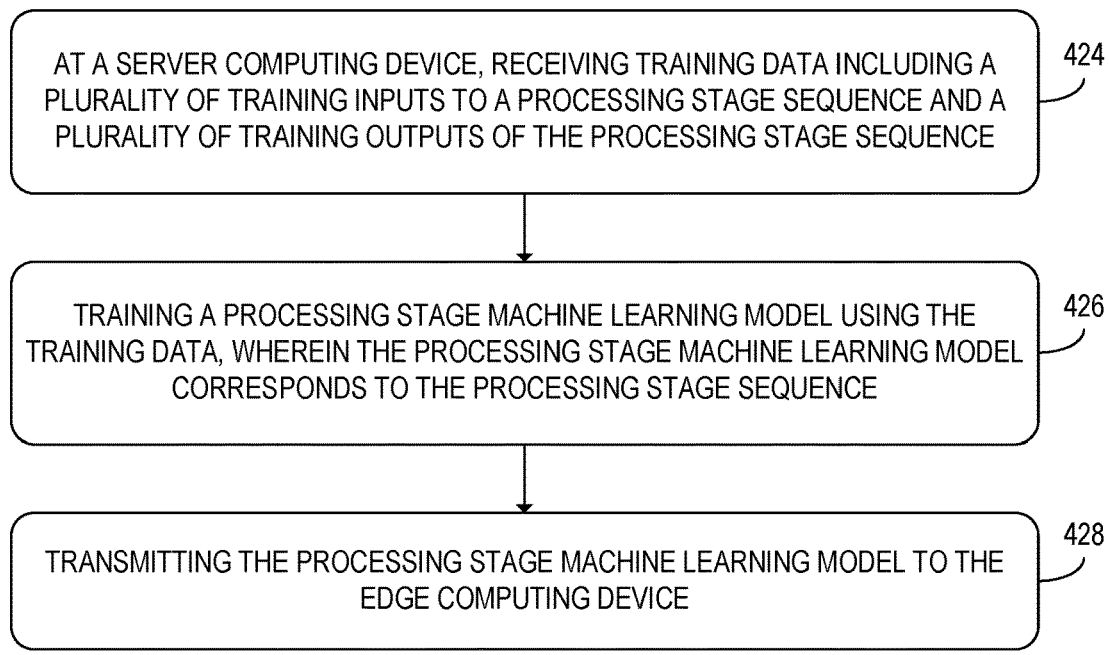
FIG. 8C shows additional steps of the method of FIG. 8A that may be performed to train each of a plurality of processing stage machine learning models.

FIG. 8C shows additional steps of the method 400 that may be performed to train each of the plurality of processing stage machine learning models stored in the edge device memory. The plurality of processing stage machine learning models may each be trained during a training phase performed at the server device processor of the server computing device and loaded into the edge device memory prior to runtime. The plurality of processing stage machine learning models may each correspond to a respective processing stage sequence of one or more training processing stages included in a training processing pipeline.

At step 424, the method 400 may further include, at the server computing device, receiving training data including a plurality of training inputs to the processing stage sequence and a plurality of training outputs of the processing stage sequence. The plurality of training outputs may, in some examples, be generated at a client computing device configured to execute the training processing pipeline. Thus, the server computing device may receive the training data without having to receive and execute the one or more training processing stages.

At step 426, the method 400 may further include training the processing stage machine learning model using the training data. The processing stage machine learning model may be trained to simulate the one or more computing processes performed at the processing stage sequence with which the plurality of training outputs are generated. At step 428, the method 400 may further include transmitting the processing stage machine learning model to the edge computing device. By performing the steps of FIG. 8C, the server device processor may train the plurality of processing stage machine learning models from among which the edge device processor may select the processing stage machine learning model for inclusion in the runtime processing pipeline.

In some examples, two or more processing stage machine learning models that have differing parameter counts may be trained to simulate a same processing stage sequence. Accordingly, the edge device processor may, for example, select from among the two or more processing stage machine learning models according to a computing resource availability level of the edge computing device. Additionally or alternatively, the plurality of processing stage machine learning models may include two or more processing stage machine learning models that are trained to simulate differing respective processing stage sequences.

Using the systems and methods discussed above, an edge computing device may construct a runtime pipeline with which runtime input is processed in a computing-resource-constrained setting. An edge device processor of the edge computing device may select a processing stage machine learning model, and in some examples one or more other runtime processing stages, for inclusion in the runtime processing pipeline, and may apply the runtime processing pipeline to the runtime input to compute a runtime output. The processing stage machine learning model may be trained to simulate a processing stage sequence that would be too compute-intensive to execute at the edge computing device, thereby allowing the edge computing device to emulate the behavior of the processing stage sequence while using fewer computing resources. The processing stage machine learning model may be selected based at least in part on computing resource availability data, such as an electrical power availability level, a connectivity schedule, a processing availability level, and/or a memory availability level of the edge computing device. Accordingly, the runtime processing pipeline may be dynamically generated at the edge computing device in a context-dependent manner that accounts for the feasibility of executing different runtime processing stages.

In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
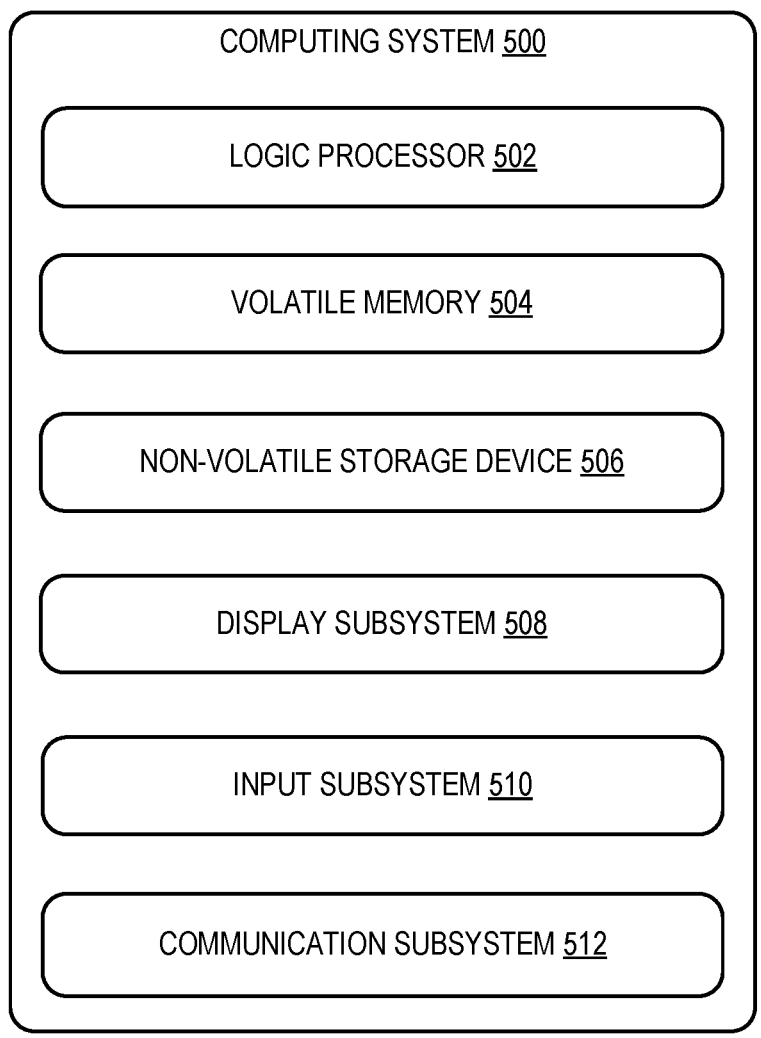
FIG. 9 shows a schematic view of an example computing environment in which the computing system of FIG. 1 may be enacted.

FIG. 9 schematically shows a non-limiting embodiment of a computing system 500 that can enact one or more of the methods and processes described above. Computing system 500 is shown in simplified form. Computing system 500 may embody the computing system 1 described above and illustrated in FIG. 1. Components of the computing system 500 may be included in one or more satellite computing devices, personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 500 includes a logic processor 502 volatile memory 504, and a non-volatile storage device 506. Computing system 500 may optionally include a display subsystem 508, input subsystem 510, communication subsystem 512, and/or other components not shown in FIG. 9.

Logic processor 502 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 502 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 506 includes one or more physical devices configured to hold instructions executable by the logic processors to implement the methods and processes described herein. When such methods and processes are implemented, the state of non-volatile storage device 506 may be transformed—e.g., to hold different data.

Non-volatile storage device 506 may include physical devices that are removable and/or built-in. Non-volatile storage device 506 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 506 may include nonvolatile, dynamic, static, read/write, read-only, sequential-access, location-addressable, file-addressable, and/or content-addressable devices. It will be appreciated that non-volatile storage device 506 is configured to hold instructions even when power is cut to the non-volatile storage device 506.

Volatile memory 504 may include physical devices that include random access memory. Volatile memory 504 is typically utilized by logic processor 502 to temporarily store information during processing of software instructions. It will be appreciated that volatile memory 504 typically does not continue to store instructions when power is cut to the volatile memory 504.

Aspects of logic processor 502, volatile memory 504, and non-volatile storage device 506 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 500 typically implemented in software by a processor to perform a particular function using portions of volatile memory, which function involves transformative processing that specially configures the processor to perform the function. Thus, a module, program, or engine may be instantiated via logic processor 502 executing instructions held by non-volatile storage device 506, using portions of volatile memory 504. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 508 may be used to present a visual representation of data held by non-volatile storage device 506. The visual representation may take the form of a graphical user interface (GUI). As the herein described methods and processes change the data held by the non-volatile storage device, and thus transform the state of the non-volatile storage device, the state of display subsystem 508 may likewise be transformed to visually represent changes in the underlying data. Display subsystem 508 may include one or more display devices utilizing virtually any type of technology. Such display devices may be combined with logic processor 502, volatile memory 504, and/or non-volatile storage device 506 in a shared enclosure, or such display devices may be peripheral display devices.

When included, input subsystem 510 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 512 may be configured to communicatively couple various computing devices described herein with each other, and with other devices. Communication subsystem 512 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 500 to send and/or receive messages to and/or from other devices via a network such as the Internet.

The following paragraphs discuss several aspects of the present disclosure. According to one aspect of the present disclosure, a computing system is provided, including an edge computing device. The edge computing device may include an edge device processor configured to, during a runtime phase, receive edge device contextual data including computing resource availability data for the edge computing device. Based at least in part on the edge device contextual data, the edge device processor may be further configured to select a processing stage machine learning model of a plurality of processing stage machine learning models stored in edge device memory of the edge computing device. The edge device processor may be further configured to construct a runtime processing pipeline of one or more runtime processing stages including the processing stage machine learning model. The edge device processor may be further configured to receive a runtime input. The edge device processor may be further configured to, at the runtime processing pipeline, generate a runtime output based at least in part on the runtime input. The edge device processor may be further configured to generate runtime pipeline metadata for the runtime output that indicates the one or more runtime processing stages included in the runtime processing pipeline. The edge device processor may be further configured to output the runtime output and the runtime pipeline metadata.

According to this aspect, the edge device processor may be configured to perform image classification at the runtime processing pipeline.

According to this aspect, the edge computing device may be an onboard computing device of a satellite. The runtime input may include satellite image data collected at an imaging sensor of the satellite.

According to this aspect, the edge device contextual data may include uplink data received at the satellite from a ground station.

According to this aspect, the edge device processor may be further configured to generate a preliminary image classification for the satellite image data. The edge device contextual data may include the preliminary image classification.

According to this aspect, the edge computing device may include one or more local sensors. The edge device contextual data may further include local sensor data received from the one or more local sensors.

According to this aspect, the edge device contextual data may include an electrical power availability level of the edge computing device.

According to this aspect, the edge device contextual data may include a connectivity schedule of the edge computing device with a server computing device.

According to this aspect, the computing system may further include a server computing device including a server device processor. The server device processor may be configured to, during a training phase, train the plurality of processing stage machine learning models. The plurality of processing stage machine learning models may each correspond to a respective processing stage sequence of one or more training processing stages included in a training processing pipeline. The plurality of processing stage machine learning models may each be trained using respective training data including a plurality of training inputs to the corresponding processing stage sequence and a plurality of training outputs received from the processing stage sequence. The server device processor may be further configured to transmit the plurality of processing stage machine learning models to the edge computing device.

According to this aspect, the plurality of processing stage machine learning models may include two or more processing stage machine learning models that are trained for a same processing stage sequence and have differing parameter counts.

According to this aspect, the plurality of processing stage machine learning models may include two or more processing stage machine learning models that are trained for differing respective processing stage sequences.

According to another aspect of the present disclosure, a method is provided for use with a computing system including an edge computing device. The method may include receiving edge device contextual data including computing resource availability data for the edge computing device. The method may further include, based at least in part on the edge device contextual data, selecting a processing stage machine learning model of a plurality of processing stage machine learning models stored in edge device memory of the edge computing device. The method may further include constructing a runtime processing pipeline of one or more runtime processing stages including the processing stage machine learning model. The method may further include receiving a runtime input. The method may further include, at the runtime processing pipeline, generating a runtime output based at least in part on the runtime input. The method may further include generating runtime pipeline metadata for the runtime output that indicates the one or more runtime processing stages included in the runtime processing pipeline. The method may further include outputting the runtime output and the runtime pipeline metadata.

According to this aspect, generating the runtime output at the runtime processing pipeline may include performing image classification.

According to this aspect, the edge computing device may be an onboard computing device of a satellite. The runtime input may include satellite image data collected at an imaging sensor of the satellite. The edge device contextual data may include uplink data received at the satellite from a ground station.

According to this aspect, the method may further include generating a preliminary image classification for the satellite image data. The edge device contextual data may include the preliminary image classification.

According to this aspect, the edge computing device may include one or more local sensors. The edge device contextual data may further include local sensor data received from the one or more local sensors.

According to this aspect, the edge device contextual data may include an electrical power availability level of the edge computing device.

According to this aspect, the edge device contextual data may include a connectivity schedule of the edge computing device with a server computing device.

According to this aspect, the computing system may further include a server computing device. The method may further include, during a training phase performed at the server computing device, training the plurality of processing stage machine learning models. The plurality of processing stage machine learning models may each correspond to a respective processing stage sequence of one or more training processing stages included in a training processing pipeline. The plurality of processing stage machine learning models may each be trained using respective training data including a plurality of training inputs to the corresponding processing stage sequence and a plurality of training outputs received from the processing stage sequence. The method may further include transmitting the plurality of processing stage machine learning models to the edge computing device.

According to another aspect of the present disclosure, a satellite is provided, including a satellite imaging sensor configured to collect satellite image data. The satellite may further include an onboard computing device including a processor configured to, during a runtime phase, receive satellite contextual data including a connectivity schedule of the onboard computing device with a ground-based computing device. Based at least in part on the satellite contextual data, the processor may be further configured to select a processing stage machine learning model of a plurality of processing stage machine learning models stored in memory included in the onboard computing device. The processor may be further configured to construct a runtime processing pipeline of one or more runtime processing stages including the processing stage machine learning model. The processor may be further configured to receive the satellite image data from the satellite imaging sensor. At the runtime processing pipeline, the processor may be further configured to generate an image processing output based at least in part on the satellite image data. The processor may be further configured to generate runtime pipeline metadata for the image processing output that indicates the one or more runtime processing stages included in the runtime processing pipeline. The processor may be further configured to output the image processing output and the runtime pipeline metadata.

"And/or" as used herein is defined as the inclusive or ∨, as specified by the following truth table:

| A | B | A ∨ B |
|---|---|-------|
| True | True | True |
| True | False | True |
| False | True | True |
| False | False | False |

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system comprising:
an edge computing device including an edge device processor configured to, during a runtime phase:
receive a runtime input, wherein the runtime input includes image data collected at an imaging sensor of the edge computing device;
receive a connectivity schedule of the edge computing device with a server computing device;
based at least in part on the image data and the connectivity schedule, generate a preliminary image classification for the image data at a preliminary image classifier machine learning model;
receive edge device contextual data including:
computing resource availability data for the edge computing device; and
the preliminary image classification;
based at least in part on the edge device contextual data, select a processing stage machine learning model of a plurality of processing stage machine learning models stored in edge device memory of the edge computing device;
construct a runtime processing pipeline of one or more runtime processing stages including the processing stage machine learning model;
at the runtime processing pipeline, generate a runtime output based at least in part on the runtime input;
generate runtime pipeline metadata for the runtime output that indicates the one or more runtime processing stages included in the runtime processing pipeline; and
output the runtime output and the runtime pipeline metadata.

2. The computing system of claim 1, wherein the edge device processor is configured to perform image classification at the runtime processing pipeline.

3. The computing system of claim 2, wherein:
the edge computing device is an onboard computing device of a satellite; and
the runtime input includes satellite image data collected at the imaging sensor.

4. The computing system of claim 3, wherein the edge device contextual data includes uplink data received at the satellite from a ground station.

5. The computing system of claim 1, wherein:
the edge computing device includes one or more additional local sensors in addition to the imaging sensor; and
the edge device contextual data further includes local sensor data received from the one or more additional local sensors.

6. The computing system of claim 1, wherein the edge device contextual data includes an electrical power availability level of the edge computing device.

7. The computing system of claim 1, further comprising the server computing device, wherein the server computing device includes a server device processor configured to, during a training phase:
train the plurality of processing stage machine learning models, wherein:
the plurality of processing stage machine learning models each correspond to a respective processing stage sequence of one or more training processing stages included in a training processing pipeline; and
the plurality of processing stage machine learning models are each trained using respective training data including:
a plurality of training inputs to the corresponding processing stage sequence; and
a plurality of training outputs received from the processing stage sequence; and
transmit the plurality of processing stage machine learning models to the edge computing device.

8. The computing system of claim 7, wherein the plurality of processing stage machine learning models includes two or more processing stage machine learning models that are trained for a same processing stage sequence and have differing parameter counts.

9. The computing system of claim 7, wherein the plurality of processing stage machine learning models includes two or more processing stage machine learning models that are trained for differing respective processing stage sequences.

10. A method for use with a computing system including an edge computing device, the method comprising:
receiving a runtime input, wherein the runtime input includes image data collected at an imaging sensor of the edge computing device;
receiving a connectivity schedule of the edge computing device with a server computing device;
based at least in part on the image data and the connectivity schedule, generating a preliminary image classification for the image data at a preliminary image classifier machine learning model;
receiving edge device contextual data including:
computing resource availability data for the edge computing device; and
the preliminary image classification;
based at least in part on the edge device contextual data, selecting a processing stage machine learning model of a plurality of processing stage machine learning models stored in edge device memory of the edge computing device;
constructing a runtime processing pipeline of one or more runtime processing stages including the processing stage machine learning model;
at the runtime processing pipeline, generating a runtime output based at least in part on the runtime input;
generating runtime pipeline metadata for the runtime output that indicates the one or more runtime processing stages included in the runtime processing pipeline; and
outputting the runtime output and the runtime pipeline metadata.

11. The method of claim 10, wherein generating the runtime output at the runtime processing pipeline includes performing image classification.

12. The method of claim 11, wherein:
the edge computing device is an onboard computing device of a satellite; and
the runtime input includes satellite image data collected at the imaging sensor; and
the edge device contextual data further includes uplink data received at the satellite from a ground station.

13. The method of claim 10, wherein:
the edge computing device includes one or more additional local sensors in addition to the imaging sensor; and
the edge device contextual data further includes local sensor data received from the one or more additional local sensors.

14. The method of claim 10, wherein the edge device contextual data includes an electrical power availability level of the edge computing device.

15. The method of claim 10, wherein:
the computing system further includes the server computing device; and
the method further comprises, during a training phase performed at the server computing device:
training the plurality of processing stage machine learning models, wherein:
the plurality of processing stage machine learning models each correspond to a respective processing stage sequence of one or more training processing stages included in a training processing pipeline; and
the plurality of processing stage machine learning models are each trained using respective training data including:
a plurality of training inputs to the corresponding processing stage sequence; and
a plurality of training outputs received from the processing stage sequence; and
transmitting the plurality of processing stage machine learning models to the edge computing device.

16. A satellite comprising:
a satellite imaging sensor configured to collect satellite image data; and
an onboard computing device including a processor configured to, during a runtime phase:
receive the satellite image data from the satellite imaging sensor;
receive a connectivity schedule of the onboard computing device with a ground-based computing device;
based at least in part on the connectivity schedule and the satellite image data, generate a preliminary image classification for the image data at a preliminary image classifier machine learning model;
based at least in part on the preliminary image classification, select a processing stage machine learning model of a plurality of processing stage machine learning models stored in memory included in the onboard computing device;

construct a runtime processing pipeline of one or more runtime processing stages including the processing stage machine learning model;
at the runtime processing pipeline, generate an image processing output based at least in part on the satellite image data;
generate runtime pipeline metadata for the image processing output that indicates the one or more runtime processing stages included in the runtime processing pipeline; and
output the image processing output and the runtime pipeline metadata.

* * * * *